United States Patent

[11] 3,633,939

| [72] | Inventors | Brice A. Evernham;<br>Alvina M. Novick, both of 1949 S. Manchester Ave. Space 99, Anaheim, Calif. 92802 |
|---|---|---|
| [21] | Appl. No. | 44,188 |
| [22] | Filed | June 8, 1970 |
| [45] | Patented | Jan. 11, 1972 |

[54] TRAILER HITCH
11 Claims, 5 Drawing Figs.

[52] U.S. Cl........................................................ 280/406 A,
                                                           267/47, 280/446 B
[51] Int. Cl....................................................... B62d 53/00
[50] Field of Search........................................... 280/406 A,
                                                           446 B; 267/47

[56] References Cited
UNITED STATES PATENTS

| 2,998,268 | 8/1861 | 08001961 | 280/506 |
| 3,434,735 | 3/1969 | Bernard | 280/446 B |
| 3,347,562 | 10/1967 | Bolyard | 280/406 A |
| 2,793,879 | 5/1957 | Bair | 280/406 A |
| 177,701 | 5/1876 | Emberger | 267/47 |
| 3,567,251 | 3/1971 | Dalton | 280/406 A |
| 3,370,867 | 2/1968 | Berlincourt | 280/406 A |

FOREIGN PATENTS

| 226,061 | 6/1958 | Australia | 280/406 A |

Primary Examiner—Leo Friaglia
Attorney—Nienow & Frater

ABSTRACT: The present invention relates to a trailer hitch that incorporates a snubbing arrangement that acts to dampen-out sidewise movements of the trailer if the trailer tends to wander from the towing track, or tends to weave from side-to-side behind the towing vehicle. The disclosed hitch comprises a brakelike arrangement that provides the actual snubbing action as soon as there is a relative rotational movement at the trailer hitch. The operative principles and various embodiments are disclosed and explained.

PATENTED JAN 11 1972 3,633,939
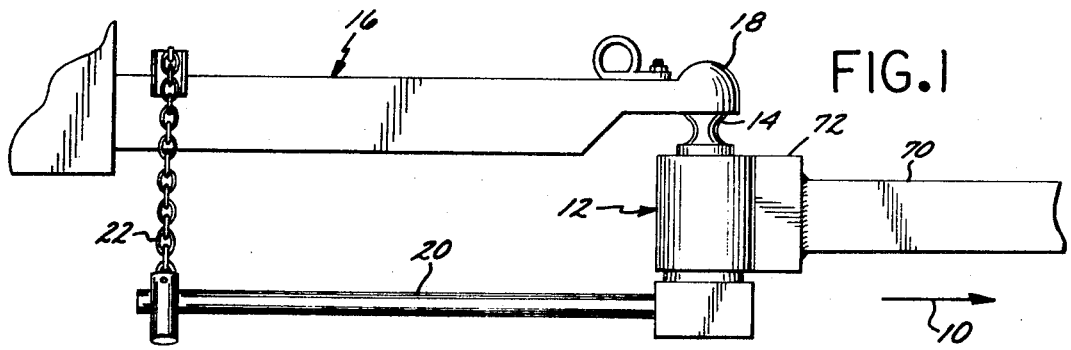
FIG.1
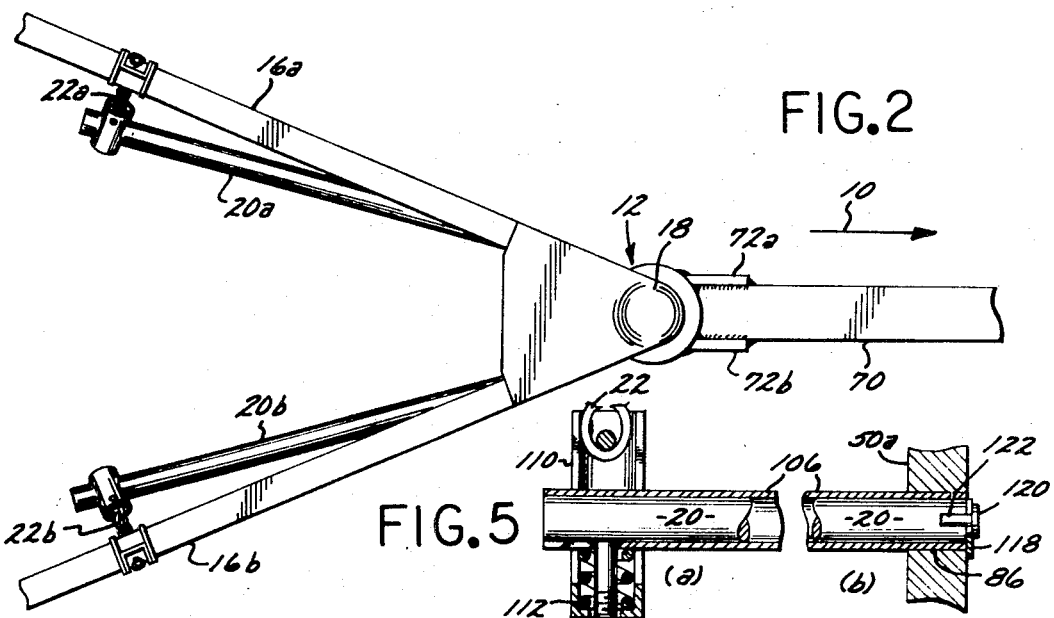
FIG.2
FIG.5
FIG.3
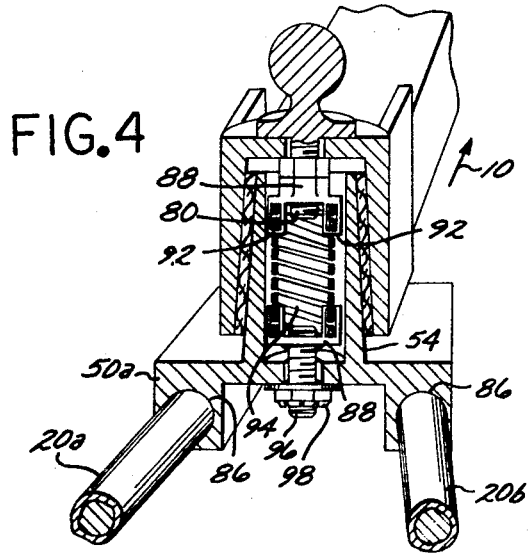
FIG.4
INVENTORS.
BRICE A. EVERNHAM
ALVINA M. NOVICK
BY
Nienow & Frater
ATTORNEYS

TRAILER HITCH

The present invention relates generally to trailer hitches, and more particularly, to hitches which have a snubbing arrangement for minimizing swaying or wandering of the trailed vehicle from the towing track.

BACKGROUND

With the ever increasing participation in outdoor activities, there has been a tremendous increase of interest in the so-called "travel trailer"; the most popular type of trailer being the two-wheeled model that is hitched to the back of an automobile, and trails along behind the automobile as the automobile moves. As the trailers became larger, their increased weight and capacity introduced the following problems.

It is impossible, as a practical matter, to concentrate all of the weight of the trailer and its contents directly over their wheels; and it is practically impossible to distribute the weight in such a way that the overall center of gravity is directly over the wheels. Therefore, due to the lack of a balanced load condition, the trailer will either tilt forward, or will tilt backwards. The backward tilt is particularly undesirable, primarily because it tends to lift the rear wheels of the automobile off the road, thus decreasing the traction. The forwardly tilting trailer, on the other hand, causes the trailer tongue to press downward on the rear end of the automobile and this downward pressure on the rear wheels tends to improve the traction. Thus, the forwardly tilting arrangement is preferred, even though it does modify the steering characteristics of the automobile.

However, as trailers became ever larger and heavier, their "tongue force," as applied to the rear end of the towing automobile, increased to the point where the rear tires of the towing automobile became overloaded. Larger rear tires helped somewhat but did not solve the problem.

The most satisfactory solution to date has been the so-called "equalizing" trailer hitch, which will be discussed more fully later. This helped appreciably by tending to equalize the load onto all of the tires of the auto/trailer combination; but now a new problem arose. Because of the relative success of the equalizer hitch, trailers became even larger and heavier; and the car/trailer combinations tended to travel at ever faster road speeds. Many of the trailers now tended to wander off the towed track to weave from side to side, or even worse, tended to oscillate. These trailer characteristics not only impaired the steering ability, but introduced a real danger factor.

OBJECTS AND DRAWINGS

It is therefore the principal object of the invention to provide an improved trailer hitch.

It is another object of the invention to provide an improved trailer hitch that minimizes the undesirable trailing characteristics of a towed vehicle.

It is still another object of the invention to provide an improved trailer hitch that minimizes wandering and weaving of a towed trailer.

It is a further object of the invention to provide an improved trailer hitch that minimizes shocks transmitted between the towed trailer and the towing vehicle.

The attainment of these objects, and others, will be realized from a study of the following detailed description, taken in conjunction with the drawings, of which FIG. 1 shows a side view of a trailer hitch,
FIG. 2 shows a top view of a trailer hitch;
FIG. 3 shows a cutaway view of one embodiment of the invention;
FIG. 4 shows a cutaway view of another embodiment of the invention; and
FIG. 5 shows a cross-sectional view of part of the linkage.

Broadly stated, the disclosed trailer hitch comprises a brakelike arrangement having two coacting cones with a frictional material, such as a brake lining, affixed to one of the conical surfaces. One of the cones is attached to the towing vehicle, and the other cone is attached to the towed vehicle, so that as the towed vehicle moves off track, the cone brake snubs the off track movement. The cone brake is arranged in a rain-resistant configuration; and the equalizing rods (if used) are linked in such a manner as to provide practically instantaneous activation of the snubbing arrangement.

Referring now to FIG. 1, there is shown one type of equalizing hitch, the illustration being for a car that is towing a trailer to the right, as indicated by arrow 10. A hitch assembly 12 is affixed to the automobile that is to do the towing, being attached to the car's rear bumper for light duty towing, and being attached to the car's frame for heavy duty towing.

Hitch assembly 12 comprises a towing ball 14, and since the actual towing forces are handled primarily by the towing ball 14, it must be firmly affixed to the towing vehicle, either affixed permanently as by welding or by permanently installed bolts, or affixed temporarily as by removable bolts.

FIG. 1 shows a trailer tongue 16, and since the actual towing forces are handled primarily by this trailer tongue, it must have its leftmost end firmly affixed to the trailer. Trailer tongue comprises, at its rightmost end, a ball coupler 18 that fits over towing ball 14. Coupler 18 is available in many forms, each of which is designed to assure that the towing ball 14 and the ball coupler 18 do not uncouple during towing, backing, parking bumping, and the like.

The towing ball 14 and ball coupler 18 form a ball-and-socket type of joint that permits either to pivot relative to the other—in either a horizontal manner as necessitated by traveling around curves and corners, and in a vertical manner as necessitated by traveling over bumps, dips, etc., in the roadway. The horizontal pivoting has a relatively wide range, whereas the vertical pivoting has a somewhat smaller range—as required by the nature of the towing operation.

It will be realized that as the trailer becomes heavier and/or more heavily loaded, its trailer tongue 16 tends to move downward toward the ground; and in so doing, it forces the towing ball 14 downward toward the ground. This is the undesirable loading condition previously discussed. To overcome this situation, the equalizing hitch assembly has a "equalizing rod" 20. Under the described condition, the trailer tongue 16 would be sloping downward to the right, while the equalizing rod 20 would be sloping downward to the left. In order to overcome this diverging relationship, the free end of equalizing rod 20 is raised—as by pulling upward on chain 22, and as a result, the formerly diverging tongue 16 and rod 20 now approach each other. Eventually, they become parallel, as illustrated, and the weight of the composite car/trailer becomes more equally divided between the various wheels of the composite car/trailer combination. In this way, the load on the tires is equalized, ground clearance is improved, and sagging is minimized.

Many methods are presently available for raising and holding the free end of the equalizing rod in order to achieve and maintain the desired equalization; these methods ranging from manually lifting the free end of the rod to the use of levers, gears, winches, and the like—the chain then being held by means of a hook or notch, or by the inherent operation of some of the devices mentioned above.

It will be noted that FIG. 1, showing a side view, makes the trailer tongue 16 and the equalizing rod 20 appear as single elements, but as seen in FIG. 2 in the illustrated arrangement, these are in actuality double elements arranged in a V-formation. It will also be noted that the equalizing rods 20a and 20b have a sharper angle than the tongue arms 16a and 16b; and the reason for this will be discussed later.

From FIG. 2, it becomes clearer how the trailer tongue can pivot around its ball-coupler 18 in order for the trailer to be towed around curves and corners; and it also becomes clearer how the trailer may tend to wander and/or weave even though the towing car is moving straight ahead.

DESCRIPTION OF THE INVENTION

Whereas most of the prior art hitching arrangements permitted the trailer tongue to pivot freely relative to the towing ball, the present invention introduces a practical snubbing arrangement that dampens out undesirable pivotal movements while still permitting desired pivotal movements in both the horizontal and vertical directions. This is accomplished as shown in the cutaway illustration of FIG. 3. In this view, a hitching assembly 12a is shown to comprise a towing ball 14 as previously described; ball 14 being affixed to an upper plate 42 that in turn has an outer cylinder 44 having a tapered inner surface 46; FIG. 3 also shows a lower plate 50 that has an inner cylinder 52 having a tapered outer surface 54. Affixed to this second tapered surface is a frictional material 58 such as brake lining, although the frictional material may be affixed to either tapered surface. For convenience of explanation, the outer and inner cylinders 44 and 52 will be called the outer and inner cones respectively.

FIG. 3 further shows that the towing ball 14 comprises a long-threaded bolt 60, although this may be integral with the ball; and shows that a locking nut 62 locks bolt 60 and towing ball 14 to the upper plate 42 in order to affix the towing ball and to prevent rotation of the bolt. Bolt 60 passes through a clearance hole in the lower plate 50 and a second locking nut 64 is tightened against the lower surface of the lower plate 50. Note the desirable use of a thrust washer or a thrust bearing 66. The action of locking nut 64 urges the inner cone 52 and its associated frictional material 58 upwards into a coacting surface relationship with the inner tapered surface 46 of the outer cone 44. Thus, the two tapered surfaces and the frictional material act in the manner of a conical friction brake, the coacting relation and the amount of snubbing action being controlled and maintained by the tightness of locking nut 64. It will be noted that the outer cylinder provides a rain protective enclosure that makes the hitch assembly rain resistant.

It will be seen that the bottom surface of lower plate 50 comprises two short tubes 68 that are welded to the lower plate 50 and that the previously discussed equalizing rods 20a and 20b fit into, and are received by, the short tubes 68. In this way, as the trailer tends to weave, the equalizing rods 20 rotate the lower plate 50 and its affixed inner cone 52 around the long bolt 60; and the above-described snubber action resists the trailer weaving. However, it will be realized that in negotiating a curve, the trailer tongue exerts a constant sidewise force on ball 14, rather than applying a constant rotating force, so that the snubbing effect does not apply; and the trailer obediently follows the towing car around the curve.

Thus, the disclosed hitch assembly provides an antiwander snubbing action that may be made as effective as desired, and still permits normal trailer operation.

It is generally desirable, and often necessary, to match the height of the towing ball 14 on the car to the height of the ball coupler 18 on the trailer in order to obtain optimal towing; but ordinarily, the hitch assembly is attached to the car, and is at a given, not easily adjustable, height. In order to achieve the desired height matching, the disclosed hitch assembly shows in FIGS. 1, 2, and 3 that a towing bar 70 which is attached to the car, preferably takes a form that has a substantially rectangular cross section.

The hitch assembly 12a therefore has a pair of spaced apart vertically extending guides 72 that receive the towing bar 70 between them. The hitch assembly 12a is then slid up or down, as required; and when the optimal height has been found, the guides and towing bar are welded together. In this way, the trailer tongue may be made horizontal for optimal towing.

Another embodiment is shown in FIG. 4. Here, the cutaway representation shows a towing ball, an upper plate, an outer cone, and a locking nut substantially as previously described. However, the previously described long bolt has been replaced by a shorter threaded bolt 80 that holds the apparatus as explained above; the further function of the short bolt to be discussed later.

The previously described lower plate has been modified to take the form of a block 50a that may be a casting. Lower plate 50a carries an inner cylinder having the described tapered outer walls and the frictional material. Rather than having the previously described short tubes on its lower surface, lower plate 50a now comprises two holes 86 for receiving the equalizing rods 20a and 20b. Thus, the structure of FIG. 4 as thus far described serves the same function as the previously described structure.

However, FIG. 4 shows a different mechanism for controlling the snubbing function. In FIG. 4, a cap 88 is screwed or otherwise fixedly attached to threaded bolt 80; cap 88 having a spring retainer 92 for holding the first few turns of a heavy compression spring 94. Spring retainer 92 may take any of a number of suitable forms, the illustration showing a pair of U-shaped brackets in which the end of spring 94 is held. The bottom of spring 94 is similarly held in any suitable manner, such as by another similar cap affixed to the end of another short threaded rod 96. As indicated, the outer end of rod 96 protrudes through a hole in block 50a 82; and a locking nut 98 is positioned on rod 96.

The configuration of FIG. 4 operates as follows. By turning the lower locking nut 98, the block 50a is raised or lowered—by adjusting the tension of spring 94—thus controlling the spacing and pressure between the inner tapered surface of the outer cone 44 and the surface of the friction material 58, thus controlling the effectiveness of the snubbing action. This adjustment is much more sensitive than the one previously described, and tends to retain the established tension despite wear of the friction material, thus being more desirable.

Another advantage accrues to the apparatus of FIG. 4, as follows. It is well known that when a vehicle accelerates, it tends to "squat down" on its rear wheels. In the embodiment of FIG. 4, this means that as the towing car accelerates, the squatting action tends to momentarily lower the towing ball, the upper plate, and the outer cone; and this momentary lowering tends to compress spring 94, and to decrease the spacing between the tapered cone surface and the friction material, thus providing a momentarily increased snubbing action. The net result is that during acceleration the snubbing action tends to hold the trailer more firmly; providing better towing action and better overall control.

In FIG. 4, the ends of the equalizing rods 20a and 20b may be anchored into the holes 86 of the lower plate 50a in any convenient manner; i.e., by a tapered fit or a force fit, by means of setscrews or the like, by the use of locking nuts, etc.

However, the equalizing rods raise another interesting problem. It will be recalled (see FIG. 1) that the free ends of the equalizing rods have to be forced upwards closer to the trailer tongue, and have to be chained in that position to provide the desired equalizing. Thus, the equalizing rods are under a constant bending force, and the magnitude of this bending force depends upon the trailer weight, the weight of its contents, the weight distribution, etc. Therefore, ideally, a variety of different strength, and therefore different diameter, equalizing rods should be available. Unfortunately, this variety would require either a variety of standard lower plate blocks with suitably sized holes, or a variety of nonstandard lower plate blocks each having holes of the desired size.

This problem, and another, is solved as shown in FIG. 5a. Here a standard equalizing rod 20 is used in all installations; and where additional strength is required, a surrounding auxiliary tube 106 of predetermined strength, wall thickness, etc., is slipped over the equalizing rod. The composite equalizing rod 20/106 thus provides a large range of strengths with one basic equalizing rod and one basic lower plate block.

Since the equalizing rod 20, and therefore, the auxiliary tube 106 are exposed to a transverse bending force, rather than being exposed to a longitudinal withdrawal force, it is not necessary that they be welded together or affixed in any way. In fact, the bending force acts to hold them together. Thus, the auxiliary tube may be replaced with another of different strength as the need arises. It will be seen that the action of the composite equalizing rod is somewhat similar to that of a helper spring as used on trucks; that is, the basic rod takes the basic load, and the auxiliary tube comes into play as the load increases.

The foregoing explanation has indicated that the free end of the equalizing rod is linked to the trailer tongue by a chain. While this chain retention method has been fairly satisfactory, it tends to impart a jolt to the trailer hitch at every bump, dip and road spot that produces a slackening of the chain tension. In order to ease this situation, FIG. 5a shows the free end of the equalizing rod to be enclosed in a slotted cylindrical member 110 to which the chain 22 is attached. A vertically positioned threaded rod 108 is affixed to the equalizing rod, and extends downward through a clearance hole in the bottom of chamber 110. A spring 112 surrounds the rod; and a locking nut 116 preloads the spring 112.

Now, when the car/trailer combination hits a bump, or a dip, spring 112 compresses or expands a given amount before the end of the equalizing rod moves; so that for relatively small road disturbances the spring absorbs the roughness without having the equalizing rod move at all. Thus, the arrangement shown in FIG. 5a provides a much smoother operation than prior art trailer hitches.

FIG. 5b shows a cross-sectional view of a way in which the end of the equalizing rod may be anchored in block 50a. Here the end of equalizing rod 20 has been inserted through hole 86 of the block 50a. At that time, a washer 118 having an elongated central hole is positioned flatwise against the end of the equalizing rod 20; and a headed pin 120 is driven through the elongated hole into a longitudinal socket 122 of the equalizing rod. The washer 118 drops down, so that the pin 120 is at the end of the elongated hole; the washer thus overlapping the hole 86 in the block 50a, and preventing the withdrawal of the equalizing rod.

It should be recalled that the forces on the equalizing rod 20 are of the vertical bending type rather than of the longitudinal withdrawal type, so that the rod 20, and the auxiliary tube 106, if one is used, is securely held for its design function.

Referring back to FIG. 2, it will be noted that the equalizing rods 20a and 20b form a sharper V-angle than the V-angle formed by the tongue arms 16a and 16b, and this has been done for the following reason. Assume for the moment that the rod and tongue arm angles were equal, so that each equalizing rod was suspended pendulumlike directly below its respective tongue arm by its length of chain. Now, if the trailer were to wander off track, its tongue arms would immediately pivot around the ball coupler 18. The equalizing rods, however, being suspended by their chains, would momentarily pendulumwise lag behind the movement of the tongue arms; in this way, permitting the trailer to wander off track.

Now consider the operation produced by the sharper V-angle of the equalizing rods. Under the above disclosed structure, the equalizing rods are not suspended pendulumlike below the tongue arms; rather, they are exposed to an upward and sidewise pull of the chains, so that the equalizing rods are exposed to a constant spreading force. Now, as soon as the tongue arms rotate around the ball coupler, one of the equalizing rods is immediately moved by its chain—without the previously discussed lag. As a result, the immediate movement of the equalizing rod produces an immediate rotation of the lower plate of the hitch assembly, thus providing immediate snubbing action that discourages trailer wander.

We claim:

1. A rain-resistant snubbing hitch for a towed/towing vehicle combination, comprising:
   a lower plate;
   an inner hollow cone affixed to said lower plate;
   an upper plate;
   an outer hollow cone affixed to said upper plate, said outer cone positioned circumjacent to said inner cone, and providing a rain-protective covering therefor;
   the tapered surfaces of said cones positioned to face each other in a coacting relationship;
   a layer of friction material mounted on the tapered surface of one of said cones, whereby said cones and said friction material define a rotation snubbing arrangement;
   spring means, positioned in the inner space common to both said hollow cones, for interconnecting and spacing said cones;
   means for attaching one of said cones to one of said vehicles;
   means for attaching the other of said cone to the other of said vehicles;
   said attaching means permitting snubbed rotation of said vehicles.

2. A rain-resistant hitch for snubbing rotation when one vehicle tows another vehicle, comprising:
   a lower plate;
   a first hollow cylinder, having its outer face tapered to form an inner cone, affixed to said lower plate;
   a layer of friction material affixed to the tapered surface of said inner cone;
   an upper plate;
   a second hollow cylinder having its inner surface tapered to form an outer cone affixed to said upper plate, said second cylinder providing a rain protective enclosure for said first cylinder;
   the tapered surfaces of said cones positioned to face each other in a coacting relationship, whereby said cones and said friction material form an arrangement for snubbing relative rotation between said cones;
   means, positioned along the axial portion of said cones, for maintaining said cones in said coacting relationship;
   first means for attaching said first cone to said towed vehicle, said first attaching means comprising a pair of V-connected equalizing rods having the first ends thereof affixed to said lower plate, and having the other ends thereof linked to said towed vehicle;
   second means for attaching said second cone to said towing vehicle, said second attaching means comprising a towing bar having one end thereof affixed to said upper plate, and having the other end thereof affixed to said towing vehicle;
   said attaching means permitting snubbed rotation to occur between said cones.

3. The combination of claim 2, wherein said maintaining means comprises a spring interconnecting and spacing said cones.

4. The combination of claim 2, wherein said upper plate comprises a pair of spaced apart vertically extending guides.

5. The combination of claim 4, wherein said towing bar is positioned between, and affixed to, said pair of guides of said upper plate.

6. The combination of claim 2, wherein said lower plate comprises a block having a pair of receiving holes for receiving said pair of equalizing rods.

7. The combination of claim 6, wherein said equalizing rod receiving holes are at a sharper angle than the tongue arms of said towed vehicle for placing said equalizing rods under a constant spreading tension.

8. The combination of claim 6, wherein respective auxiliary tubes surround respective equalizing rods, said rod/tube combinations forming stronger composite equalizing rods.

9. The combination of claim 8, including means for retaining said rod/tube combination in said hole of said block, said retaining means comprising
   a longitudinal socket in the end of said rod;
   a washer having an elongated central opening;
   a headed pin traversing said washer opening,
   and being received in said longitudinal socket at the end of said equalizing rod.

10. A rain-resistant trailer hitch for permitting one vehicle to tow another vehicle, and to provide a snubbing action against relative rotation at the hitch comprising:
    a blocklike lower plate having a pair of holes therein for receiving a pair of equalizing rods;

a first, hollow cylindrical cylinder having its outer surface tapered to form an inner cone, said first cylinder being substantially perpendicularly positioned, and being affixed to said lower plate;

a layer of friction material mounted on the tapered surface of said inner cone;

an upper plate;

a second hollow cylinder having its inner surface tapered to form an outer cone, said second cylinder being substantially perpendicularly positioned, and being affixed to said upper plate, and providing a rain-protective enclosure for said inner cone;

the tapered surfaces of said cones facing each other in a coacting relationship, whereby said cones and said friction material form an arrangement for snubbing relative rotation between said cones;

a pair of spaced apart vertically extending guides affixed to said upper plate;

means, comprising a spring interconnecting and spacing said cones, positioned along the axial portion of said cones, for maintaining said cones in said coacting relationship;

first means for attaching said first cone to said towed vehicle, said first attaching means comprising a pair of V-connected equalizing rods having their first ends receiving in said receiving holes of said blocklike lower plate, and having their other ends linked to said towed vehicle;

second means for attaching said second cone to said towing vehicle, said second attaching means comprising a towing bar having one end thereof positioned between and affixed to said guides of said upper plate, and having the other end thereof affixed to said towing vehicle;

said attaching means providing snubbed rotation when said towed vehicle tends to wander from the true towing track.

11. The combination of claim 10, wherein said equalizing rod comprises a standard equalizing rod surrounded by an auxiliary tube for providing a composite equalizing rod of desired strength.

* * * * *